July 5, 1927.
A. ORTLOFF
1,634,433
SELF SUPPORTING CARRIAGE BODY FOR MOTOR DRIVEN VEHICLES
Original Filed July 22, 1925
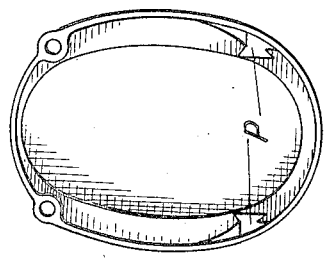
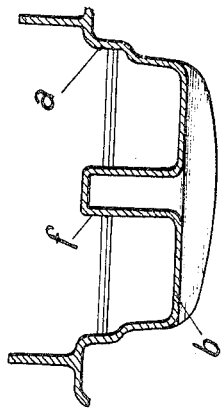
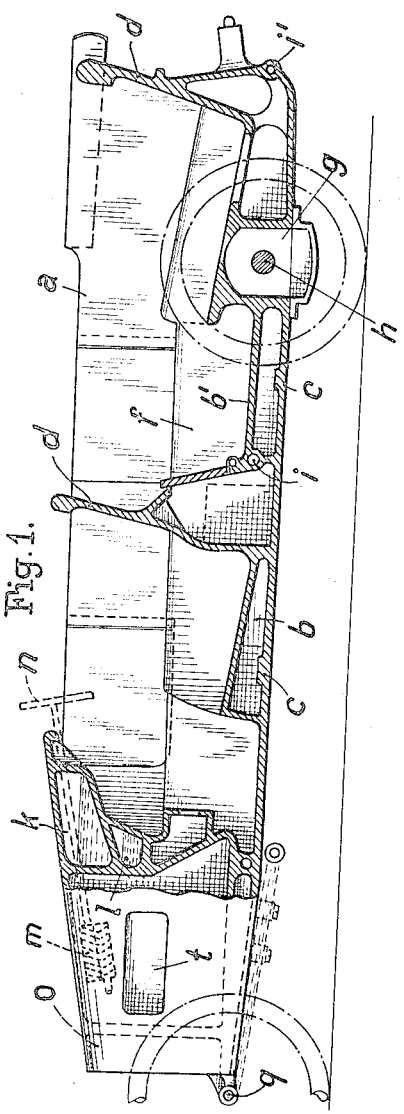
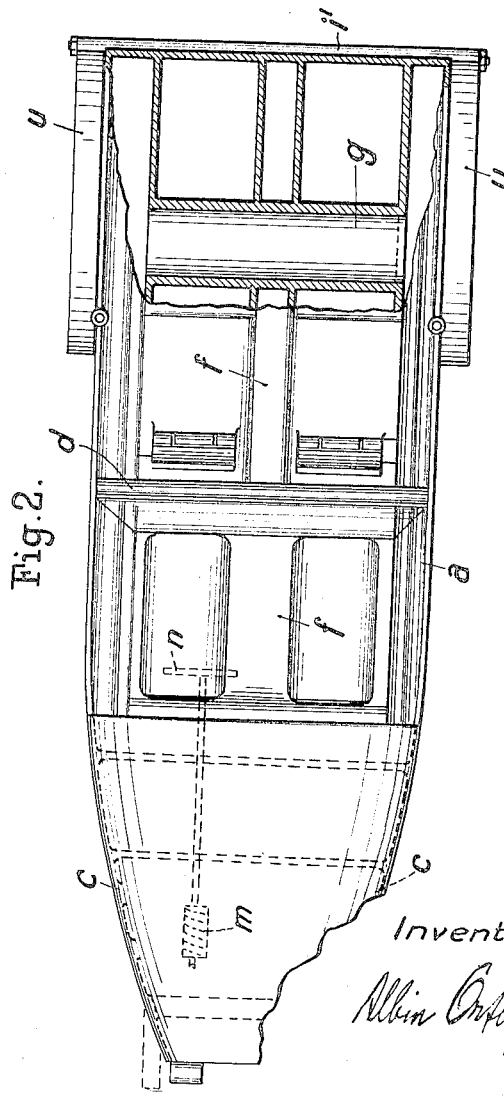
Inventor:
Albin Ortloff Patented July 5, 1927.

1,634,433

UNITED STATES PATENT OFFICE.

ALBIN ORTLOFF, OF MEININGEN, GERMANY.

SELF-SUPPORTING CARRIAGE BODY FOR MOTOR-DRIVEN VEHICLES.

Application filed July 22, 1925, Serial No. 45,322, and in Germany July 22, 1924. Renewed January 22, 1927.

This invention relates to a self-supporting carriage body for motor driven vehicles and it consists in that the carriage body is cast in one piece with the frame, the engine bonnet, the case for the steering gear, the benzine and oil reservoirs, and the transverse and longitudinal stiffenings. A portion of the longitudinal stiffening which is constructed, in known manner, to journal the driving shaft, extends in upward direction so that it serves at the same time as arm supports for the occupants of the car. The invention consists further in that in the engine bonnet dove-tail shaped guide ribs are arranged on which the engine and the radiator are fixed so that they can be easily exchanged.

The carriage body is specially distinguished by simple and cheap manufacturing and further by light weight as aluminium can be used as casting metal. Bending or edging within the sheet metal plates and channel-iron bearer is absolutely prevented which happens frequently in the commonly used carriage frames.

The spring suspension is mounted on axles which traverse the carriage body in order to distribute over the entire load the shocks produced by the unevenness of the road and to soften the same as much as possible.

An embodiment of the invention is shown, by way of example on the accompanying drawing in which:—

Fig. 1 is a longitudinal section of the improved body and frame.

Fig. 2 is a horizontal section of the same.

Fig. 3 is a vertical cross section through the front portion of the carriage body.

Fig. 4 is a vertical cross section of the body and frame.

As Figs. 1 and 4 show clearly, the carriage body $a$ and the frame are cast in one piece, preferably from aluminium which presents the advantage to be of lighter weight and cheaper in manufacturing than other material. The bottom $b$ is either entirely or partly double-walled, the upper wall of the bottom having the shape of seats to be fitted with cushions.

Ribs $c$ and partition walls $d$ on the bottom and on the side walls serve to stiffen the carriage body and to increase the stability. The partitions $d$ are shaped to serve as seat backs and arm supports.

In order to obtain a mounting of the driving shaft free from shocks the bottom $c$ has a U-shaped upwardly directed projection $f$ which extends along the central line of the bottom.

As shown in Figs. 2 and 4 this hollow projection $f$ divides the seats into two halves forming at the same time the middle arm support.

Underneath the rear seats a box-shaped hollow compartment $g$ is arranged which extends transversely across the carriage frame and serves to accommodate the rear axle $h$. By this shape of the bottom of the carriage sufficient play in vertical direction is given to the driving shaft and to the rear axle, so that, when strong shocks occur, the spring suspensions of the axles are sufficiently equalized. The axle springs for the rear axle are attached at $i$ and $i'$.

The seats are arranged in an especially practical manner as they are situated very deep and have high backs so that the weight is as far down as possible, any danger of skidding and turning over being avoided. The car opposes a smaller surface to the wind as it is much lower owing to the arrangement that the seats are arranged at the sides of the Cardan shaft instead of above the same.

The front portion of the carriage body, in front of the driver's seat, forms the engine bonnet on which the casing $m$ of the steering gear is cast, the roof of the engine bonnet forming the benzine reservoir $k$ and the oil reservoir $l$. $n$ is the steering wheel. The engine is guided, together with the radiator $o$, upon dove-tail shaped guides $p$, Fig. 3, so that the engine can be easily removed together with the radiator and put in again. The front portion of the carriage body and of the guide ribs may be of any convenient shape.

Underneath the engine bonnet supporting springs for the front wheel axle $q$ are fixed at either side, the arrangement being such that the front axle is situated together with the front or steering wheels in front of the radiator whereby the steering of the car is facilitated. The engine bonnet has apertures $t$ in its sides, which are adapted to be closed by any convenient means and facilitate the access to the engine. In the side walls of the carriage body doors are arranged as usual.

For technical reasons the carriage body might be cast in two longitudinal halves which have to be united.

The improved carriage body can be cast in any size together with the accessories, as mud guards *u*, benzine tanks, fixation for spare tires and the like.

I claim:—

1. Self-supporting carriage body for motor driven vehicles cast in one piece with the frame, the engine bonnet, the benzine reservoir, the oil reservoir, the casing for the steering gear, and the cross and longitudinal stiffenings.

2. Self-supporting carriage body for motor driven vehicles cast in two halves but in one piece with the frame, the engine bonnet, the benzine reservoir, the oil reservoir, the casing for the steering gear and the cross and longitudinal stiffenings.

3. Self-supporting carriage body for motor driven vehicles cast in one piece with the frame, the engine bonnet, the benzine reservoir, the oil reservoir, the casing for the steering gear and the cross and longitudinal stiffenings, a portion of the longitudinal stiffening being raised so that it forms a hollow web designed to accommodate the driving shaft and to serve as arm-supports for the seats.

4. Self-supporting carriage body for motor driven vehicles cast in one piece with the frame, the engine bonnet, the benzine reservoir, the oil reservoir, the casing for the steering gear and the cross and longitudinal stiffenings, dove-tail shaped guide ribs being arranged on the inner surface of the side walls of the engine bonnet to serve as guides for the engine and the radiator to facilitate the removal and insertion of the same.

In testimony whereof I affix my signature.

ALBIN ORTLOFF.